United States Patent
Chakraborty et al.

(10) Patent No.: US 11,942,796 B2
(45) Date of Patent: Mar. 26, 2024

(54) WIRELESS POWER FOR SENSOR ARRAYS

(71) Applicant: INTERNATIONAL BUSINESS MACHINES CORPORATION, Armonk, NY (US)

(72) Inventors: Sudipto Chakraborty, Plano, TX (US); Rajiv Joshi, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 17/172,419

(22) Filed: Feb. 10, 2021

(65) Prior Publication Data

US 2022/0255362 A1 Aug. 11, 2022

(51) Int. Cl.
| | | |
|---|---|---|
| H02J 50/20 | (2016.01) | |
| H02J 7/00 | (2006.01) | |
| H02J 7/04 | (2006.01) | |
| H02J 50/10 | (2016.01) | |
| H02J 50/40 | (2016.01) | |
| H02J 50/80 | (2016.01) | |

(52) U.S. Cl.
CPC ............ *H02J 50/40* (2016.02); *H02J 7/0013* (2013.01); *H02J 7/04* (2013.01); *H02J 50/10* (2016.02); *H02J 50/80* (2016.02)

(58) Field of Classification Search
CPC .................................................... H02J 50/40
USPC ......................................................... 320/108
See application file for complete search history.

(56) References Cited

U.S. PATENT DOCUMENTS

| | | | |
|---|---|---|---|
| 5,400,037 | A | 3/1995 | East |
| 7,893,564 | B2 | 2/2011 | Bennett |
| 9,620,996 | B2 | 4/2017 | Zeine et al. |
| 9,900,057 | B2 | 2/2018 | Leabman et al. |
| 10,164,469 | B1 * | 12/2018 | Jadidian ................. H02J 50/90 |

(Continued)

FOREIGN PATENT DOCUMENTS

| | | |
|---|---|---|
| CN | 101645618 A | 2/2010 |
| CN | 102859840 A | 1/2013 |

(Continued)

OTHER PUBLICATIONS

Awai, I., "Design Theory of Wireless Power Transfer System Based on Magnetically Coupled Resonators", 2010 IEEE International Conference on Wireless Information Technology and Systems. Aug. 28, 2010. pp. 1-4.

(Continued)

*Primary Examiner* — Edward Tso
*Assistant Examiner* — Ahmed H Omar
(74) *Attorney, Agent, or Firm* — Tutunjian & Bitetto, P.C.; Samuel Waldbaum

(57) ABSTRACT

A wireless power system includes a phase locked loop (PLL) providing an input signal tuned in frequency, a plurality of dividers coupled to the PLL to divide the frequency of the input signal, a plurality of phase interpolators electrically connected to the plurality of dividers to generate multiple phases based on the input signal, and a plurality of drivers electrically connected to the plurality of phase interpolators to direct a plurality of output signals each having a different frequency to a plurality of sensor clusters, each sensor cluster operating at a different frequency.

20 Claims, 11 Drawing Sheets

(56) References Cited

U.S. PATENT DOCUMENTS

| | | | |
|---|---|---|---|
| 10,560,097 B1* | 2/2020 | Peng | ................ H03K 19/1737 |
| 2010/0033021 A1 | 2/2010 | Bennett | |
| 2010/0034238 A1 | 2/2010 | Bennett | |
| 2010/0201310 A1 | 8/2010 | Vorenkamp et al. | |
| 2011/0080050 A1 | 4/2011 | Thundat et al. | |
| 2011/0151789 A1 | 6/2011 | Viglione et al. | |
| 2013/0020988 A1* | 1/2013 | Kim | ................ H02J 50/12 |
| | | | 320/108 |
| 2013/0241309 A1 | 9/2013 | Arnold et al. | |
| 2013/0249305 A1* | 9/2013 | Kudo | ................ H02J 50/12 |
| | | | 320/108 |
| 2013/0300204 A1 | 11/2013 | Partovi | |
| 2014/0035379 A1* | 2/2014 | Stevens | ................ H02J 50/12 |
| | | | 307/104 |
| 2016/0049823 A1* | 2/2016 | Stein | ................ H04B 7/0617 |
| | | | 320/108 |
| 2016/0268843 A1 | 9/2016 | Barman | |
| 2017/0047968 A1* | 2/2017 | Moshfeghi | ............ H04B 5/0037 |
| 2017/0111087 A1 | 4/2017 | Williamson | |
| 2017/0288738 A1* | 10/2017 | Lee | ................ H02J 50/20 |
| 2018/0309454 A1 | 10/2018 | Kyung et al. | |
| 2019/0044390 A1 | 2/2019 | Hajimiri et al. | |

FOREIGN PATENT DOCUMENTS

| | | | | |
|---|---|---|---|---|
| CN | 105375951 | A | 3/2016 | |
| CN | 105765821 | A | 7/2016 | |
| CN | 108736926 | A | 11/2018 | |
| JP | 2017073930 | A | 4/2017 | |
| KR | 20190141282 | A | * 12/2019 | ............. B60L 53/12 |

OTHER PUBLICATIONS

Du, Z., "Active Harmonic Elimination in Multilevel Converters", Proceedings of 2004 IEEE Workshop on Computers in Power Electronics. Aug. 15, 2004. pp. 127-132.

Barnett et al., "A Passive UHF RFID Transponder for EPC Gen 2 with—14dBm Sensitivity in 0.13µm CMOS", 2007 International Solid-State Circuits Conference. Session 32, No. 8. TD: Trends in Wireless Systems. Feb. 14, 2007. pp. 1-3.

Biswas et al., "An NFC (Near-field Communication) based Wireless Power Transfer System Design with Miniaturized Receiver Coil for Optogenetic Implants", 2018 Texas Symposium on Wireless and Microwave Circuits and Systems (WMCS). Apr. 5, 2018. pp. 1-5.

Shinohara, N., "Power Without Wires", IEEE Microwave Magazine. Dec. 2011 Supplement. pp. S64-S73.

Tomar et al., "Wireless power Transmission: Applications and Components", International Journal of Engineering Research & Technology. vol. 1, Issue 5. Jul. 2012. pp. 1-9.

Tseng et al., "Phased Array Focusing for Acoustic Wireless Power Transfer", IEEE Transactions on Ultrasonics, Ferroelectronics, and Frequency Control. vol. 65, No. 1. Jan. 1, 2018. pp. 39-49.

Mell et al., "The NIST Definition of Cloud Computing", National Institute of Standards and Technology, Special Publication 800-145, Sep. 2011, pp. 1-7.

1 International Search Report issued in PCT Application No. PCT/CN2022/070539, dated Apr. 6, 2022, pp. 1-10.

\* cited by examiner

WIRELESS POWER FOR SENSOR ARRAYS

BACKGROUND

The present invention relates generally to signal processing for communication systems, and more specifically, to wireless power systems for wirelessly powering sensor arrays.

Portable devices such as mobile phones, laptop computers, tablets, and other communication devices often rely on electrical battery energy to conduct communications. Electrical batteries store chemical energy and deliver electrical energy through an electrochemical conversion process. An electrical battery includes one or more cells, organized in an array. Each cell includes an anode, a cathode, and an electrolyte that separates the two electrodes and allows the transfer of electrons as ions between them. A chemical material that originates chemical reactions within the cell is called an active material. In practice, the energy that can be obtained from a cell is fundamentally limited by the quantity of active material included in the cell. Electrical batteries may be non-rechargeable or rechargeable. Although some portable devices may use non-rechargeable batteries, the vast majority depend on rechargeable batteries. Portable devices run on batteries. Display, hard disk, logic, and memory are the device components with the greatest impact on power consumption. However, when a wireless interface is added to a portable system, power consumption increases significantly.

SUMMARY

In accordance with an embodiment, a wireless power system is provided. The wireless power system includes a phase locked loop (PLL) providing an input signal tuned in frequency, a plurality of dividers coupled to the PLL to divide the frequency of the input signal, a plurality of phase interpolators electrically connected to the plurality of dividers to generate multiple phases based on the input signal, and a plurality of drivers electrically connected to the plurality of phase interpolators to direct a plurality of output signals each having a different frequency to a plurality of sensor clusters, each sensor cluster operating at a different frequency.

In accordance with another embodiment, a method is provided. The method includes generating an input signal tuned in frequency by a phase locked loop (PLL), dividing a frequency of an input signal by a plurality of dividers coupled to the PLL, electrically connecting a plurality of phase interpolators to the plurality of dividers to generate multiple phases based on the input signal, and electrically connecting a plurality of drivers to the plurality of phase interpolators to direct a plurality of output signals each having a different frequency to a plurality of sensor clusters, each sensor cluster operating at a different frequency.

In accordance with yet another embodiment, a wireless power system is provided. The wireless power system includes a plurality of dividers each associated with a phased locked loop system to divide a frequency of an input signal, a plurality of phase interpolators electrically connected to each of the plurality of dividers such that each divider of the plurality of dividers generates a different frequency, and a plurality of drivers electrically connected to the plurality of phase interpolators to digitally steer each of the different frequencies to respective sensor clusters.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
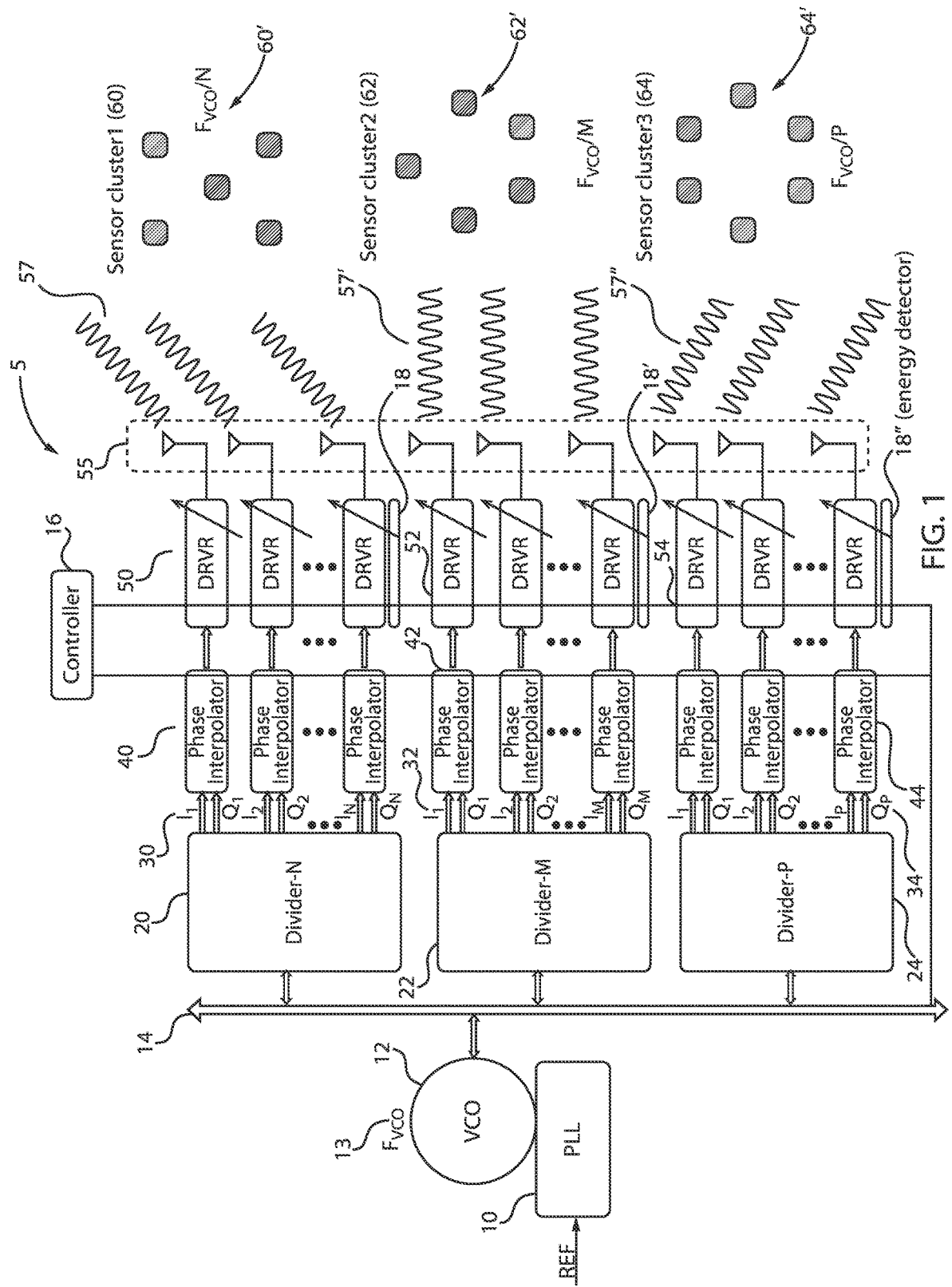
FIG. 1 shows an exemplary wireless power system, in accordance with an embodiment of the present invention.

Embodiments in accordance with the present invention provide methods and devices for wirelessly powering sensor arrays. Wireless charging may be omni-present in the near future with applications of wireless power transmission seemingly unbounded. Wireless charging may make numerous electronic devices "truly portable" or "truly tether free." Wireless power delivery may be especially valuable in scenarios where wired connections are intractable. For example, if unattended radio frequency identification tags and implanted sensors are powered remotely, they would be free of battery life restrictions and in turn significant functionality enhancements are expected. Furthermore, when applied in conjunction with renewable energy sources (such as wind and solar), wireless power transfer may enable fundamentally new energy scavenging systems with high efficiency and low cost.

During wireless power transmission, power loss is due to many factors, most notably RF-to-direct-current (RF-DC) conversion and radiofrequency (RF) propagation. Recent development of rectifying antennas (rectennas) has significantly mitigated RF-DC conversion loss, and spatial beamforming (that is, spatial focusing of electromagnetic radiation) may be an effective means for improving the RF propagation efficiency. Beamforming may be relatively simple for stationary devices with high-gain/highly-directive antennas, but beamforming remains challenging for multiple mobile/portable devices residing in a large area. Traditional phased-array beamforming may not be an ideal solution, as it may fail when the line-of-sight path between the phased-array and the target device is obstructed by obstacles. As radiation of high-frequency radio waves is potentially harmful to human beings, it may also be challenging to deliver sufficient power to portable devices while ensuring human safety.

The exemplary systems and methods take into account at least some of the issues discussed above, as well as possibly other issues. More particularly, the exemplary systems and methods enable wireless power transmission that includes planar, smaller and lighter apparatuses, and demonstrate high power efficiency and little hazardous impact. In particular, the exemplary embodiments introduce a beamforming approach where near field is used for electromagnetic coupling (inductor/transformers) and far field is used for radiating elements (antenna arrays). The exemplary methods and systems employ a single phase locked loop (PLL) and highly-efficient driver blocks. The driver blocks are run by programmable frequency dividers to obtain multiple phases. Phases are selected by phase interpolators to digitally steer or direct beams or signals to a plurality of sensor clusters, each sensor cluster operating at a different frequency. The sensor devices can be recharged one at a time and multiple sensor devices can be recharged at the same time. In one example, a single frequency is used to power the entire sensor array. In another example, multiple frequencies are used to power the sensor array. The near and far field powering is thus possible by using the same hardware, where high-efficiency drivers can be used with harmonic cancellation. Harmonic cancellation provides for Federal Communications Commission (FCC) compliance. Additionally, the beams or signals are digitally steerable toward the desirable sensor clusters. Thus, in summary, beamforming and beam steering techniques are employed, multiple phases are used for harmonic cancellation, and various frequencies can be concurrently used to wirelessly power sensor arrays.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 shows an exemplary wireless power system, in accordance with an embodiment of the present invention.

In the wireless power system 5, an input signal or reference signal (REF) is received by a phase locked loop (PLL) 10, which includes at least a voltage controlled oscillator (VCO) 12. The PLL's 10 output voltage-controlled frequency 13 is designated by $F_{vco}$. The PLL 10 generally receives the input reference signal (REF) and tunes the VCO 12 such that the VCO output signal $F_{vco}$(13) achieves phase lock with the reference signal (REF). Here, phase lock means that the difference between the input and output signal phases will remain constant over time. The time required to tune the VCO 12 is referred to as the "tuning time." The output of the PLL 10 is provided to a divider network including dividers 20, 22, 24 via a bus 14.

Dividers 20, 22, 24 can be, e.g., frequency dividers. In the instant case, three frequency dividers 20, 22, 24 are illustrated. One skilled in the art can contemplate any number of frequency dividers connected to the bus 14. The frequency dividers 20, 22, 24 simply divide the received frequency into lower frequencies. Thus, the output of frequency dividers 20, 22, 24 is a fraction of the input signal or reference signal (REF).

The output 30 of the first frequency divider 20 is provided to a plurality of phase interpolators 40. The output 30 includes I/Q signals. The term "I/Q" is an abbreviation for "in-phase" and "quadrature." I/Q signaling refers to the use of two sinusoids that have the same frequency and a relative phase shift of 90°. By convention, the I signal is a cosine waveform, and the Q signal is a sine waveform. The sine and cosine waves are in quadrature, that is, the sine wave is shifted by 90° relative to the cosine wave. Amplitude, phase, and frequency modulation can be performed by summing amplitude-modulated I/Q signals. However, I/Q signals are always amplitude-modulated.

Similarly, the output 32 of the second frequency divider 22 is provided to a plurality of phase interpolators 42 and the output 34 of the second frequency divider 24 is provided to a plurality of phase interpolators 44. Each divider 20, 22, 24 thus generates a different frequency. As a result, the three dividers 20, 22, 24 generate three different frequencies. Each divider 20, 22, 24 eventually charges a different cluster of sensors 60, 62, 64 at a same or common frequency. For example, the first sensor cluster 60 receives a first frequency, the second sensor cluster 62 receives a second frequency, and the third sensor cluster 64 receives a third frequency, where the first, second, and third frequencies are different from each other.

The phase interpolators 40, 42, 44 receive the I/Q signals 30, 32, 34, respectively.

Data communication speeds in electronic systems continue to increase. At these speeds, clock and data recovery (CDR) circuitry (or clock generation network) is needed to accurately (with low bit-error rate) recover the received data. Many CDR circuits (or clock generation networks) include phase interpolators to enable adjustment of the phase of the clock or clocks used to sample or re-time the incoming data stream. A phase interpolator, which is sometimes referred to as a mixer, is a key component of a clock and data recovery (CDR) circuit. A CDR circuit implements a control loop that can adjust the data sampling clock to sample the data at the center of the data eye. The linearity of the phase interpolator is a key component in determining the CDR system performance. An analog current mode logic (CML) phase interpolator receives differential CML quadrature clocks and mixes them together in a controlled ratio to generate an output clock that has a controlled phase offset from the differential CML quadrature clocks. The phase of the output clock can cover a full 360 degree rotation. A phase interpolator can be implemented to cover a wide range of input frequencies, such as between 2 GHz and 18 GHz. A phase interpolator can use different programmable power consumption settings that usually relate to the operating frequency, where higher operating frequencies generally need higher power to achieve the necessary bandwidth (e.g., gain at the output of the CML stage).

The phase interpolators 40, 42, 44 can be used to control the phase, the amplitude, and the frequency of devices. Thus, the phase interpolators 40, 42, 44 can control the sensors 60', 62' 64' based on at least three different variables.

The outputs generated by the phase interpolators 40 are fed into respective drivers 50. Similarly, the outputs generated by the phase interpolators 42 are fed into respective drivers 52 and the outputs generated by the phase interpolators 44 are fed into respective drivers 54. Drivers 50 can be referred to as a first set of drivers, drivers 52 can be referred to as a second set of drivers, and drivers 54 can be referred to as a third set of drivers. The drivers 50, 52, 54 can also be referred to as amplifiers.

Drivers 50, 52, 54 operate concurrently. Thus, the wireless power system 5 uses an array of parallel drivers that operate concurrently. Each driver 50, 52, 54 uses a different phase from the clock generation network or phase interpolators 40, 42, 44, respectively. The drivers 50, 52, 54 are driven close to saturation, thus leading to harmonics at the output, which will be discussed further with reference to FIGS. 2 and 3. Inductive elements 55 can be used for near field wireless transfer. The inductive elements 55 can be antennas. In particular, the first set of drivers 50 can emit a first power signal 57 to wirelessly power a first sensor cluster 60 including a plurality of sensors 60'. Similarly, the second set of drivers 52 can emit a second power signal 57' to wirelessly power a second sensor cluster 62 including a plurality of sensors 62' and the third set of drivers 54 can emit a third power signal 57" to wirelessly power a third sensor cluster 64 including a plurality of sensors 64'.

The plurality of sensors 60' of the first sensor cluster 60 are incorporated into a plurality of devices operating at a first frequency. The first frequency is the same frequency for all devices including the sensors 60'. Similarly, the plurality of sensors 62' of the second sensor cluster 62 are incorporated into a plurality of devices operating at a second frequency. The second frequency is the same frequency for all devices including the sensors 62'. Similarly, the plurality of sensors 64' of the third sensor cluster 64 are incorporated into a plurality of devices operating at a third frequency. The third frequency is the same frequency for all devices including the sensors 64'. The first, second, and third frequencies are different from each other.

The wireless power system 5 allows for the charging of multiple devices at the same time even though such devices have different frequencies. In other words, the wireless power system 5 can handle multiple frequencies concurrently. The phase interpolators 40, 42, 44 create multiple phases such that the respective drivers 50, 52, 54 steer or direct the respective beams 57, 57', 57" to the appropriate sensor clusters. Thus, the first set of interpolators 40 enable the first set of drivers 50 to generate a first beam 57 operating a first frequency that wirelessly powers all of the sensors 60' of the first sensor cluster 60, as all the sensors 60' are associated with devices operating at that first frequency. The first sensor cluster 60 can operate at a frequency of, e.g., 900 MHz, the second sensor cluster 62 can operate at a frequency of, e.g., 433 MHz, and the third sensor cluster 64 can operate at a frequency of, e.g., 315 MHz. The wireless power system 5 can generate such different frequencies concurrently to power different devices (having different operating frequencies) concurrently.

The first set of interpolators 40 thus enable the steering of the beam 57 toward the first sensor cluster 60. Similarly, the second set of interpolators 42 enable the second set of drivers 52 to generate a second beam 57' operating a second frequency (different than the first frequency) that wirelessly powers all of the sensors 62' of the second sensor cluster 62, as all the sensors 62' are associated with devices operating at that second frequency. The second set of interpolators 42 thus enable the steering of the beam 57' toward the second sensor cluster 62.

Similarly, the third set of interpolators 44 enable the third set of drivers 54 to generate a third beam 57" operating a third frequency (different than the first and second frequencies) that wirelessly powers all of the sensors 64' of the third sensor cluster 64, as all the sensors 64' are associated with devices operating at that third frequency. The third set of interpolators 44 thus enable the steering of the beam 57" toward the third sensor cluster 64.

The plurality of phase interpolators 40, 42, 44 are electrically connected to a controller 16. Additionally, the plurality of drivers 50, 52, 54 are electrically connected to the controller 16. The controller 16 can be electrically connected to the bus 14. Also, each set of drivers is electrically connected to an energy monitor or detector. For example, the first set of drivers 50 is electrically connected to an energy detector 18. The second set of drivers 52 is electrically connected to an energy detector 18' and the third set of drivers 54 is electrically connected to an energy detector 18". Therefore, the plurality of interpolators 40, 42, 44 and the plurality of drivers 50, 52, 54 are configured by using controller 16 and the energy detectors 18, 18', 18" observe the output to determine charging levels of the sensor clusters 60, 62, 64.

Therefore, according to the wireless power system 5 of FIG. 1, multiple frequencies may be concurrently or simultaneously generated to charge multiple devices and more than one cluster of sensors can be charged at the same time.

Figure 2:
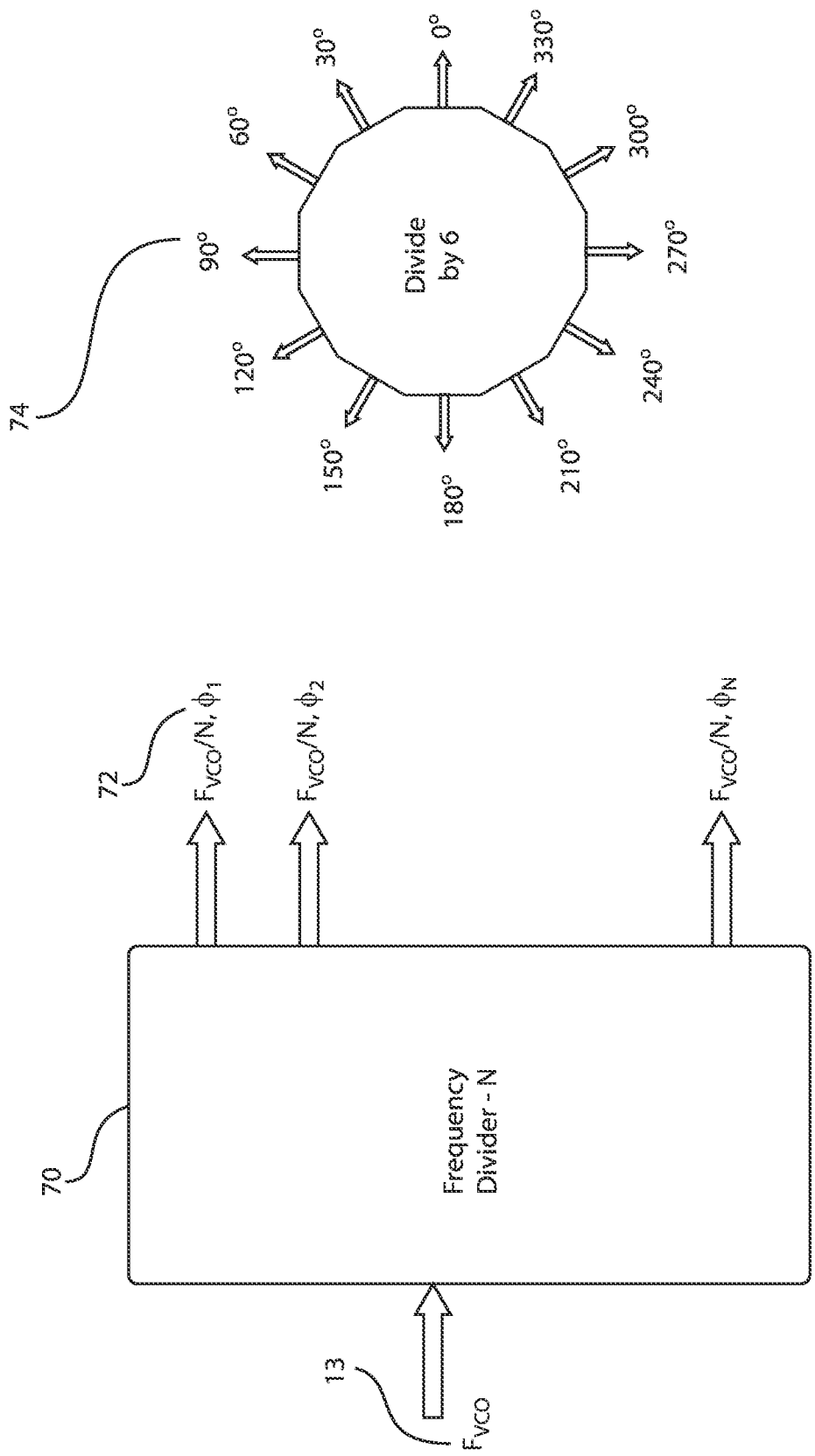
FIG. 2 is a frequency divider for creating the coarse phase step, in accordance with an embodiment of the present invention.

FIG. 2 is a frequency divider for creating the coarse phase step, in accordance with an embodiment of the present invention.

The wireless power system 5 incorporates two phase locked loops. One PLL is used to provide coarse tuning within the frequency band of interest while the second PLL provides fine tuning steps. Attempts have been made to improve PLL tuning time without introducing excess noise in the output signal. For example, several existing PLL designs use a coarse tuning technique in which a coarse tuning circuit provides the majority of voltage slew and a fine tuning circuit provides the remaining voltage slew. Many coarse tune circuits need a VCO having two tune lines (a coarse tune line and a fine tune line) and/or other additional circuitry.

The frequency divider 70 receives the VCO output signal $F_{vco}$ (13) and provides N phases at the output with 180/N degrees difference 72 between adjacent phasors. This assists in the creation of a coarse phase step using the frequency divider 70. The phase interpolator constellation 74 illustrates the different programmable phase positions of the input clock signal. An I/Q phase interpolator to be calibrated is configured to generate, e.g., 12 equally spaced phase positions in the instant case. For example, a first clock position is achieved based on a weighted combination of quadrature (positive or negative) and in-phase (positive or negative) input signal component.

Figure 3:
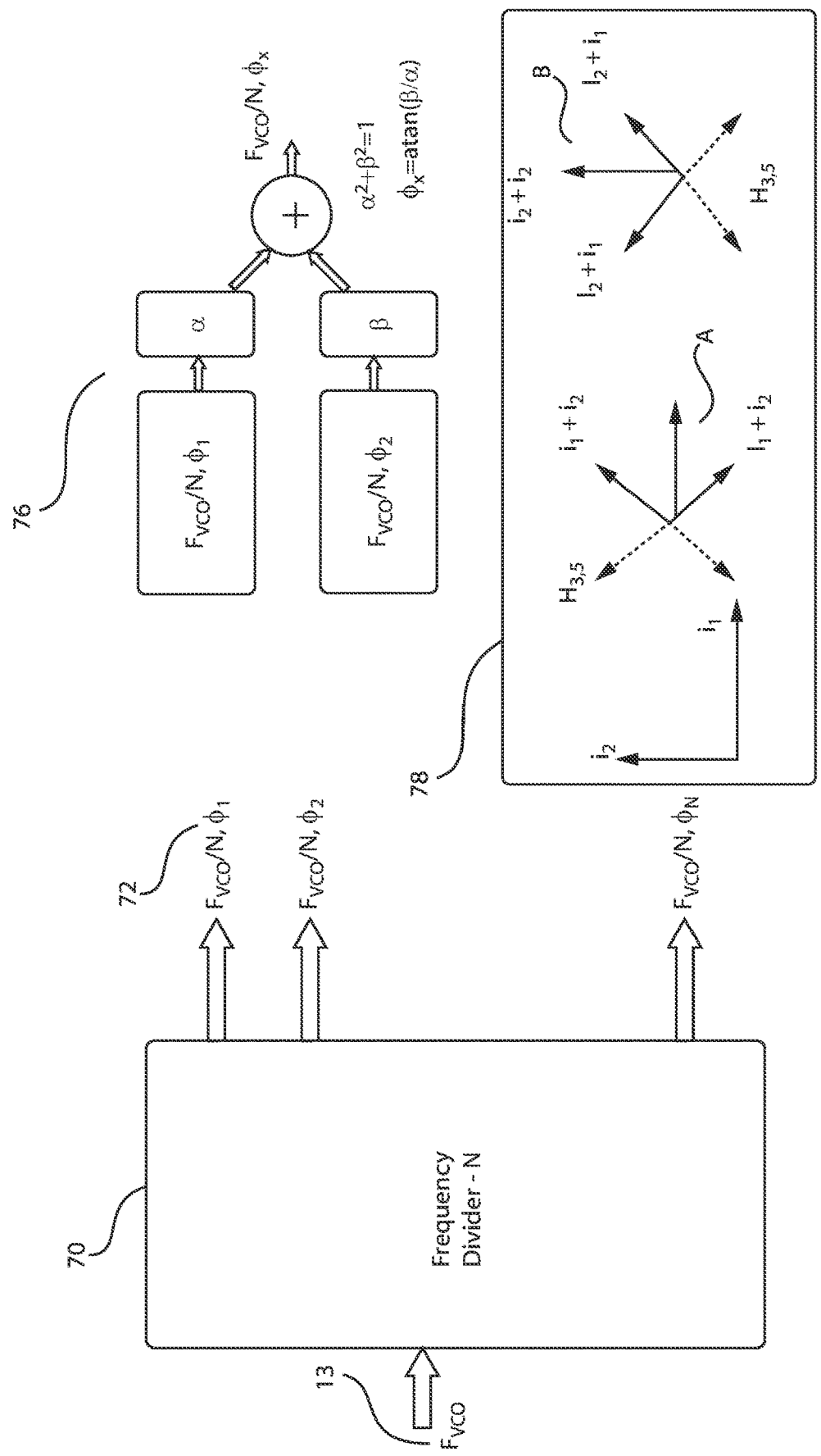
FIG. 3 is a frequency divider for creating the fine phase step, and illustrating out-of-band fidelity, in accordance with an embodiment of the present invention.

FIG. 3 is a frequency divider for creating the fine phase step, and illustrating out-of-band fidelity, in accordance with an embodiment of the present invention.

The frequency divider 70 receives the VCO output signal $F_{vco}$ (13) and provides N phases at the output with 180/N degrees difference 72 between adjacent phasors. This assists in the creation of a coarse phase step using the frequency divider 70, as well as a fine phase step using a phase interpolator.

Granularity of the phasor scheme is given by 180/N. Quadrature phases are available at N/2 taps away from each of the phasor outputs. For N=6, every $3^{rd}$ tap would be 900 out of phase. Six possible combinations for the coarse step are given by: {0,90}, {30,120}, {60,150}, {90,180}, {120, 210}, {150,240}. The method can use the other six in differential positions, 180° apart from the above values. Element 76 depicts general equations for determining phase positions.

Moreover, any high-efficiency driver/amplifier would produce harmonics of carrier tone. Even order harmonics are usually suppressed by differential construction, whereas odd order harmonics can be suppressed by phasor alignment.

Harmonics are electric voltages and currents on an electric power system that can cause power quality problems. Harmonics are created by electronic equipment with non-linear loads drawing in current in abrupt short pulses. In other words, harmonics are a distortion of the normal electrical current waveform, generally transmitted by non-linear loads. The short pulses cause distorted current waveforms, which in turn cause harmonic currents to flow back into other parts of the power system. Harmonics are currents or voltages with frequencies that are integer multiples of the fundamental power frequency. If the fundamental power frequency is 60 Hz, then the $2^{nd}$ harmonic is 120 Hz, the $3^{rd}$ is 180 Hz, etc.

The best way to eliminate harmonics is to use a technique known as "phase shifting." The concept of phase shifting involves separating the electrical signal into several outputs, each output being phase shifted with the other outputs with an appropriate angle for the harmonics to be mitigated (e.g., suppressed). The idea is to displace the harmonic currents in order to bring them to a 1800 phase shift so that they cancel each other out. Hence, in the instant case, an angular displacement of 60° is needed between two three-phase outputs to cancel the $3^{rd}$ harmonic currents and an angular displacement of 30° is needed between two three-phase outputs to cancel the $5^{th}$ and $7^{th}$ harmonic currents. Element 78 illustrates the cancellation of the $3^{rd}$ and $5^{th}$ harmonics of the wireless power system 5 at points A and B.

Therefore, these harmonics are spatially combined to augment the fundamental beam, while suppressing the out of the band harmonics. Spatial coupling can be performed using inductive coupling or spatial coupling performed using radiative beams. The entire array of drivers thus uses the same frequency to wirelessly power a cluster of sensors operating at that same frequency. In one instance, M out of N drivers use a center frequency F1, P out of N drivers use center frequency F2, Q out of N drivers use center frequency F3, and so on, where M+P+Q=N. It is further noted that the driver channels can use the same phase locked loop system and that the driver channels can alternatively use a plurality of phase locked system providing frequencies F1, F2, F3, and so on. Also, a vector modulator stage can be coupled to the driver and the divider to provide fine beam steering.

Figure 4:
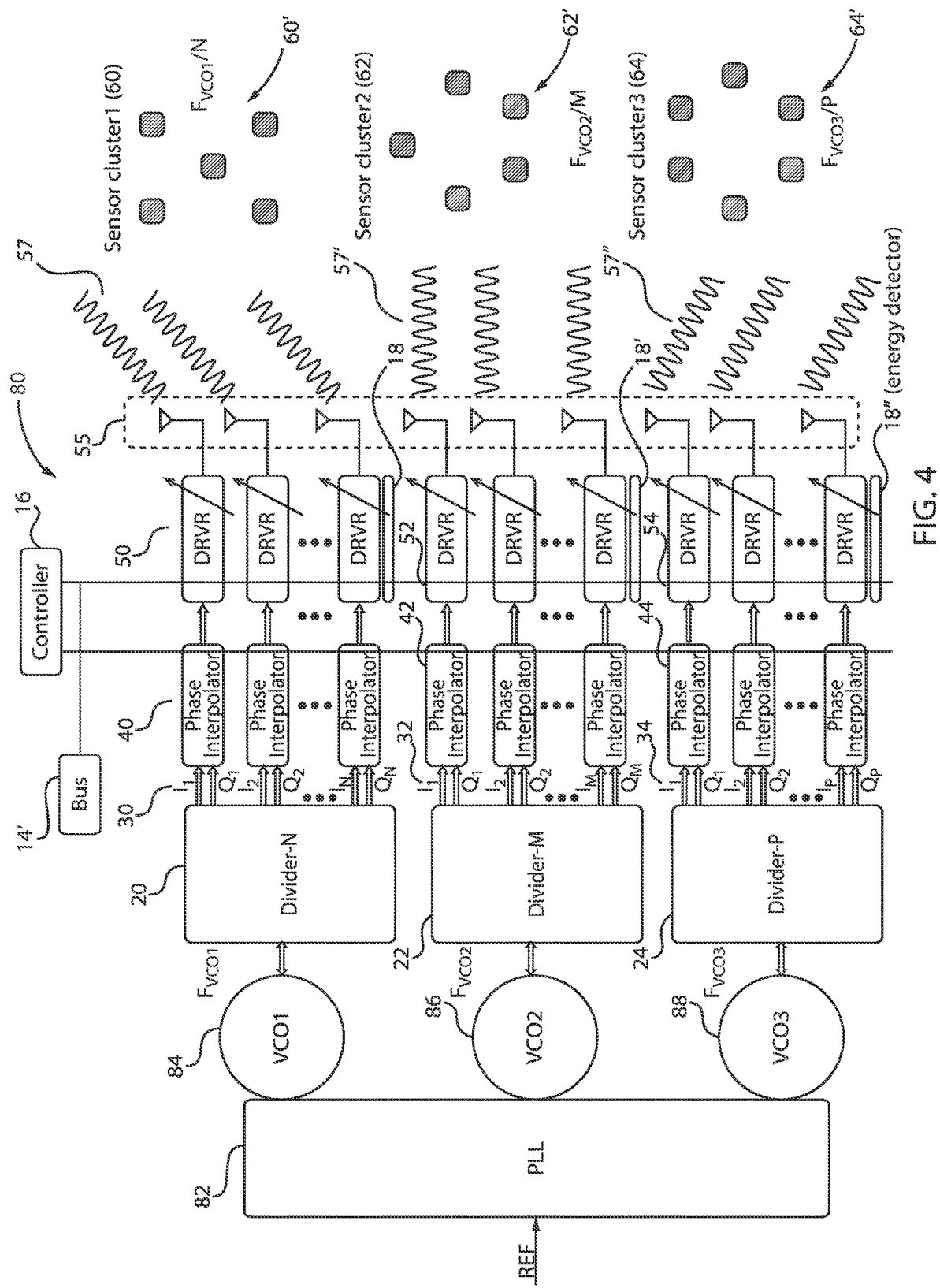
FIG. 4 shows an exemplary wireless power system, in accordance with another embodiment of the present invention.

FIG. 4 shows an exemplary wireless power system 80, in accordance with another embodiment of the present invention.

Similar elements to FIG. 1 will not be described for sake of clarity.

In contrast to FIG. 1, FIG. 4 employs a voltage controlled oscillator for each divider. In particular, the input signal or reference signal (REF) is received by a phase locked loop (PLL) 82, which includes three voltage controlled oscillator (VCOs) 84, 86, 88. The PLL's 82 output voltage-controlled frequencies are designated by $F_{vco1}$, $F_{vco2}$, and $F_{vco3}$. Thus, each divider 20, 22, 24 is associated with its own VCO 84, 86, 88, respectively.

The plurality of phase interpolators 40, 42, 44 are electrically connected to a controller 16. Additionally, the plurality of drivers 50, 52, 54 are electrically connected to the controller 16. The controller 16 can be electrically connected to the bus 14'. Also, each set of drivers is electrically connected to an energy monitor or detector. For example, the first set of drivers 50 is electrically connected to an energy detector 18. The second set of drivers 52 is electrically connected to an energy detector 18' and the third set of drivers 54 is electrically connected to an energy detector 18". Therefore, the plurality of interpolators 40, 42, 44 and the plurality of drivers 50, 52, 54 are configured by using controller 16 and the energy detectors 18, 18', 18" observe the output to determine charging levels of the sensor clusters 60, 62, 64.

The wireless power systems 5, 80 can be standalone devices or components that power a plurality of sensors at a multitude of frequencies. The wireless power systems 5, 80 can be positioned in proximity to the sensors or clusters of sensors to wirelessly transmit power thereto. In one example, the wireless power systems 5, 80 can be positioned between about 5-10 meters (or 16-22 feet) from the sensors or clusters of sensors. It is anticipated that such wireless power systems 5, 80 are affixed within a reasonable vicinity of sensors or clusters of sensors to wirelessly transmit power thereto.

Consequently, according to FIGS. 1-4, a beamforming approach is employed where near field is used for electromagnetic coupling (inductor/transformers) and far field is used for radiating elements (antenna arrays). The exemplary methods and systems employ a single PLL and highly-efficient driver blocks. The driver blocks are run by programmable dividers to obtain multiple phases. Phases are selected by phase interpolators to digitally steer beams or signals to a plurality of sensor clusters, each sensor cluster operating at a different frequency. The sensor devices can be recharged one at a time and multiple sensor devices can be recharged at the same time. In one example, a single frequency is used to power the entire sensor array. In another example, multiple frequencies are used to power the sensor array. The near and far field powering is thus possible by using the same hardware, where high-efficiency drivers can be used with harmonic cancellation. Harmonic cancellation provides for FCC compliance. Additionally, the beams or signals are digitally steerable toward the desirable sensor clusters. Thus, in summary, beamforming and beam steering techniques are employed, multiple phases are used for harmonic cancellation, and various frequencies can be concurrently used to wirelessly power sensor arrays.

Figure 5:
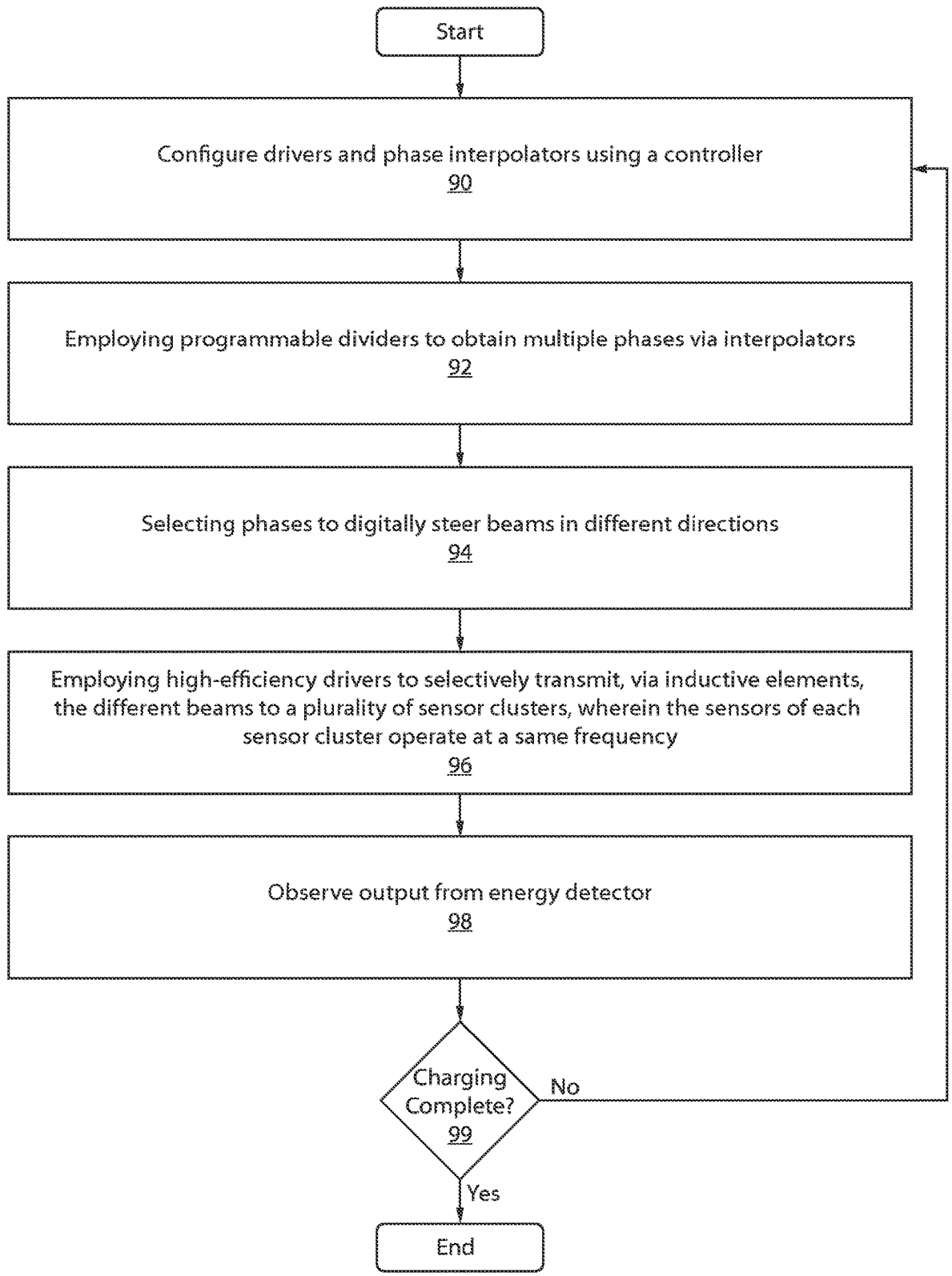
FIG. 5 is a block/flow diagram of an exemplary method for wirelessly powering a plurality of sensor arrays, in accordance with an embodiment of the present invention.

FIG. 5 is a block/flow diagram of an exemplary method for wirelessly powering a plurality of sensor arrays, in accordance with an embodiment of the present invention.

At block 90, the plurality of interpolators and the plurality of drivers are configured by using a controller.

At block 92, employ programmable dividers to obtain multiple phases via phase interpolators.

At block 94, select phases to digitally steer beams in different directions.

At block 96, employ high-efficiency drivers/amplifiers to selectively transmit, via inductive elements, the different beams to a plurality of sensor clusters, wherein the sensors of each sensor cluster operate at a same frequency.

At block 98, observe the output from the energy detectors.

At block 99, determine whether the charging (or individual sensors or sensor clusters) is complete. If YES, the process ends. If NO, then the process resumes at block 90.

Figure 6:
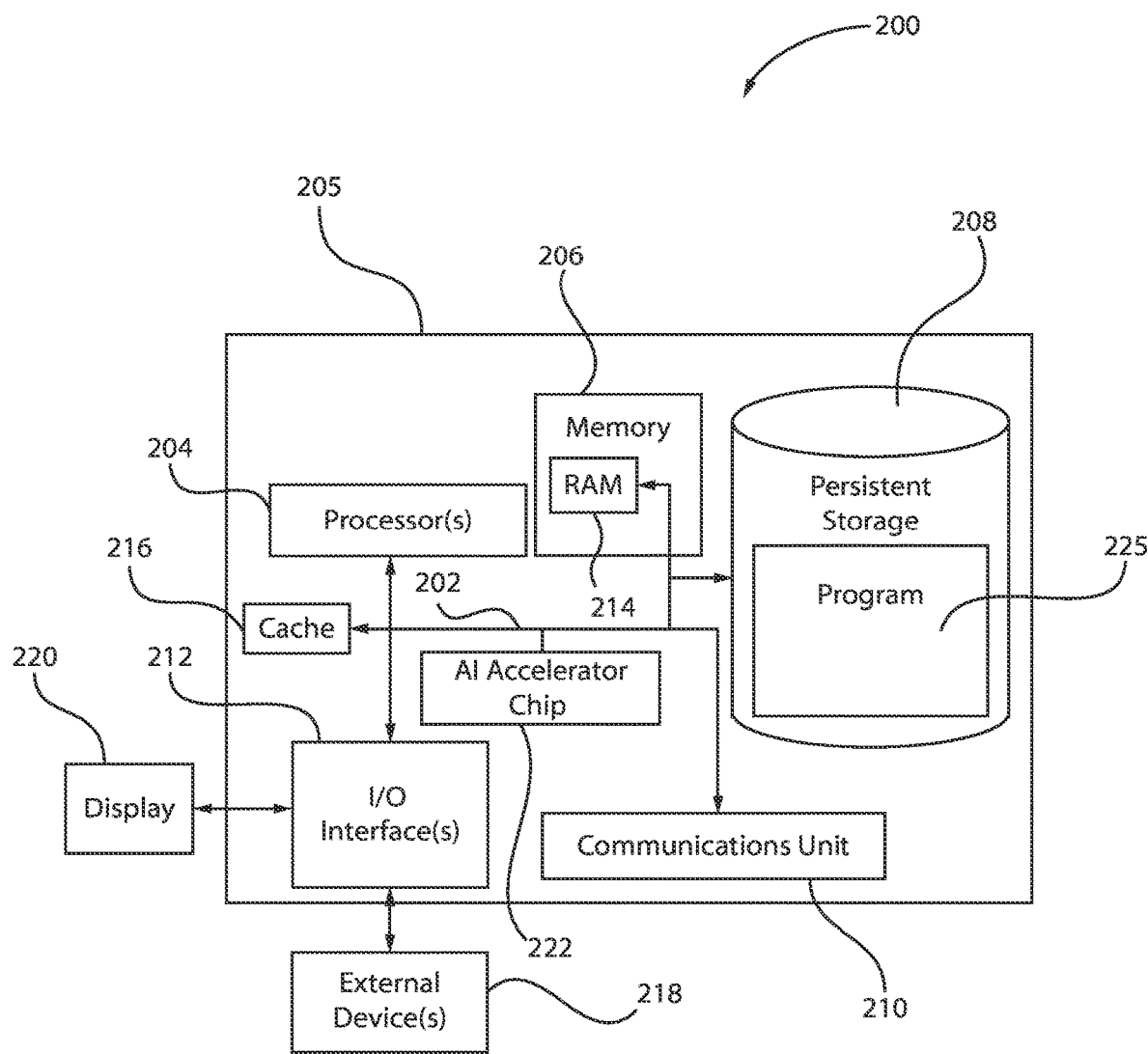
FIG. 6 is a block/flow diagram of an exemplary processing system employing an artificial intelligence (AI) accelerator chip, in accordance with an embodiment of the present invention.

FIG. 6 is a block/flow diagram of an exemplary processing system employing an artificial intelligence (AI) accelerator chip, in accordance with an embodiment of the present invention.

FIG. 6 depicts a block diagram of components of system 200, which includes computing device 205. It should be appreciated that FIG. 6 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI Accelerator chip 222 as a component of computing device 205. The AI Accelerator chip 222 can employ the wireless power system 5, 80 to wirelessly power a plurality of communication devices and/or sensors, as described below with reference to FIGS. 9-11. In other embodiments, program 225 is stored in persistent storage 208 for execution by AI Accelerator chip 222 in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 7:
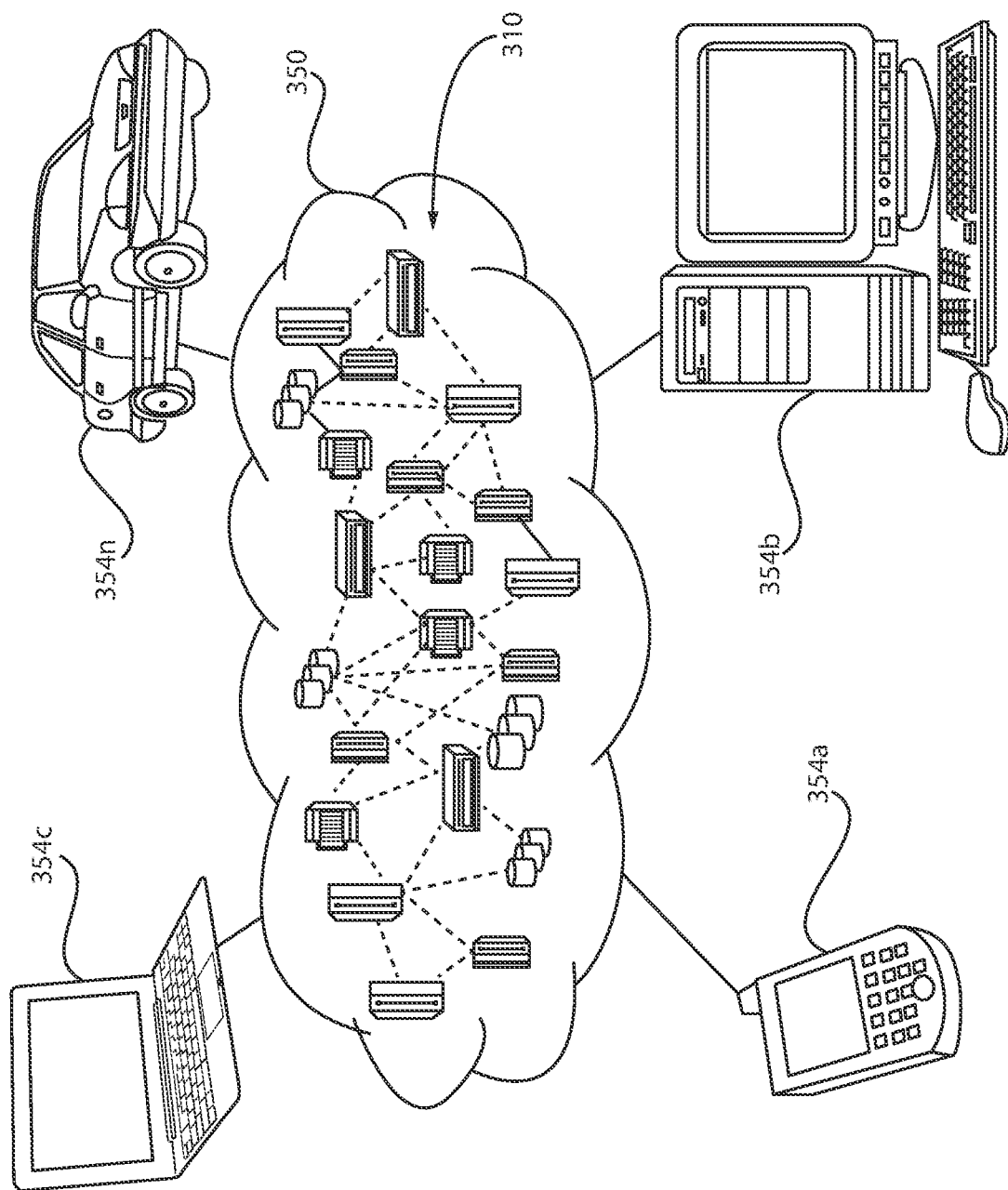
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 350 is depicted for enabling use cases of the present invention. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N can communicate. Nodes 310 can communicate with one another. They can be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 7 are intended to be illustrative only and that computing nodes 310 and cloud computing environment 350 can communicate with any type of computerized device over any type of network and/or network addressable connection (e.g., using a web browser).

Figure 8:
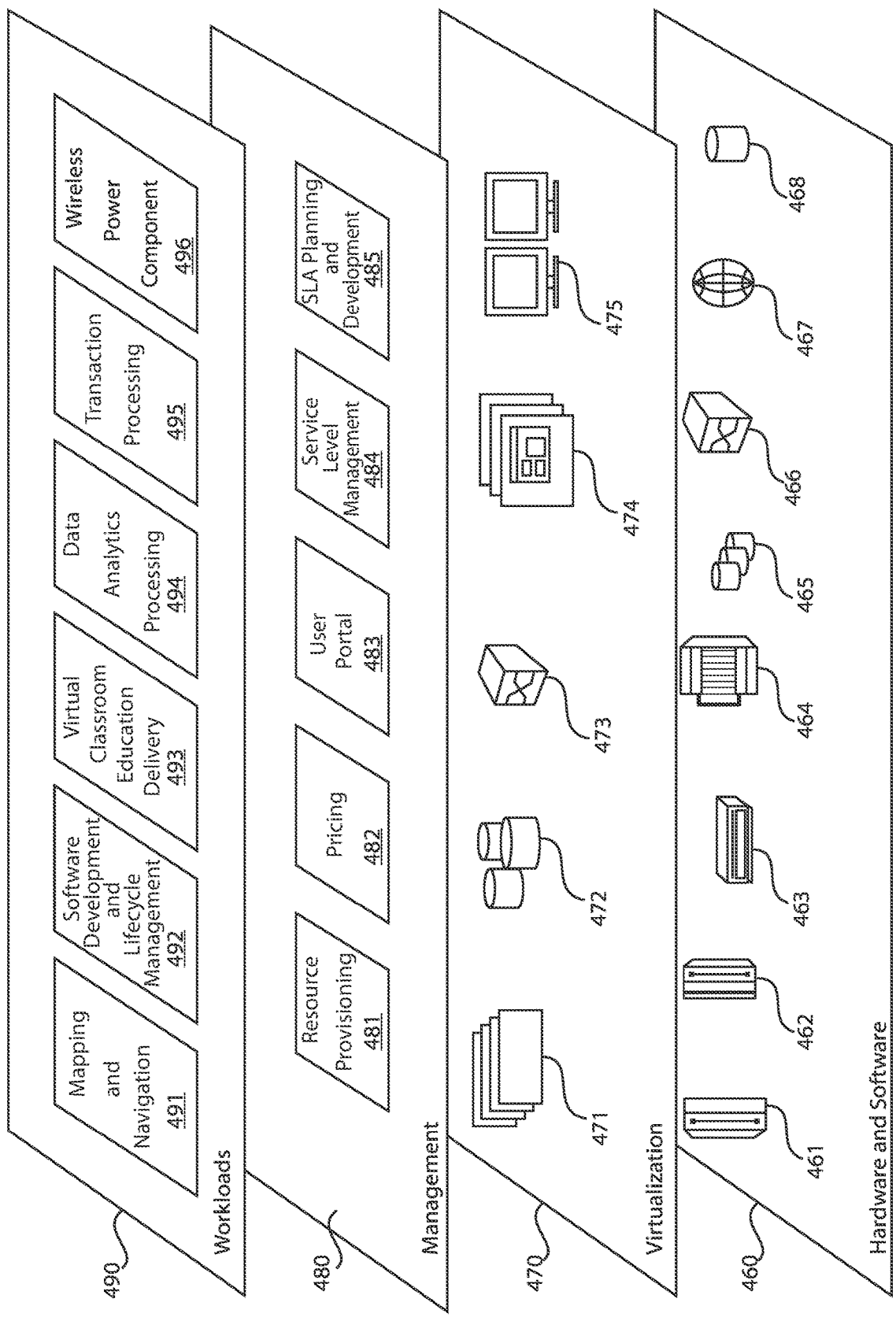
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities can be provided: virtual servers 471; virtual storage 472; virtual networks 473, including virtual private networks; virtual applications and operating systems 474; and virtual clients 475.

In one example, management layer 480 can provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment can be utilized. Examples of workloads and functions which can be provided from this layer include: mapping and navigation 441; software development and lifecycle management 492; virtual classroom education delivery 493; data analytics processing 494; transaction processing 495; and wireless power component 496.

Figure 9:
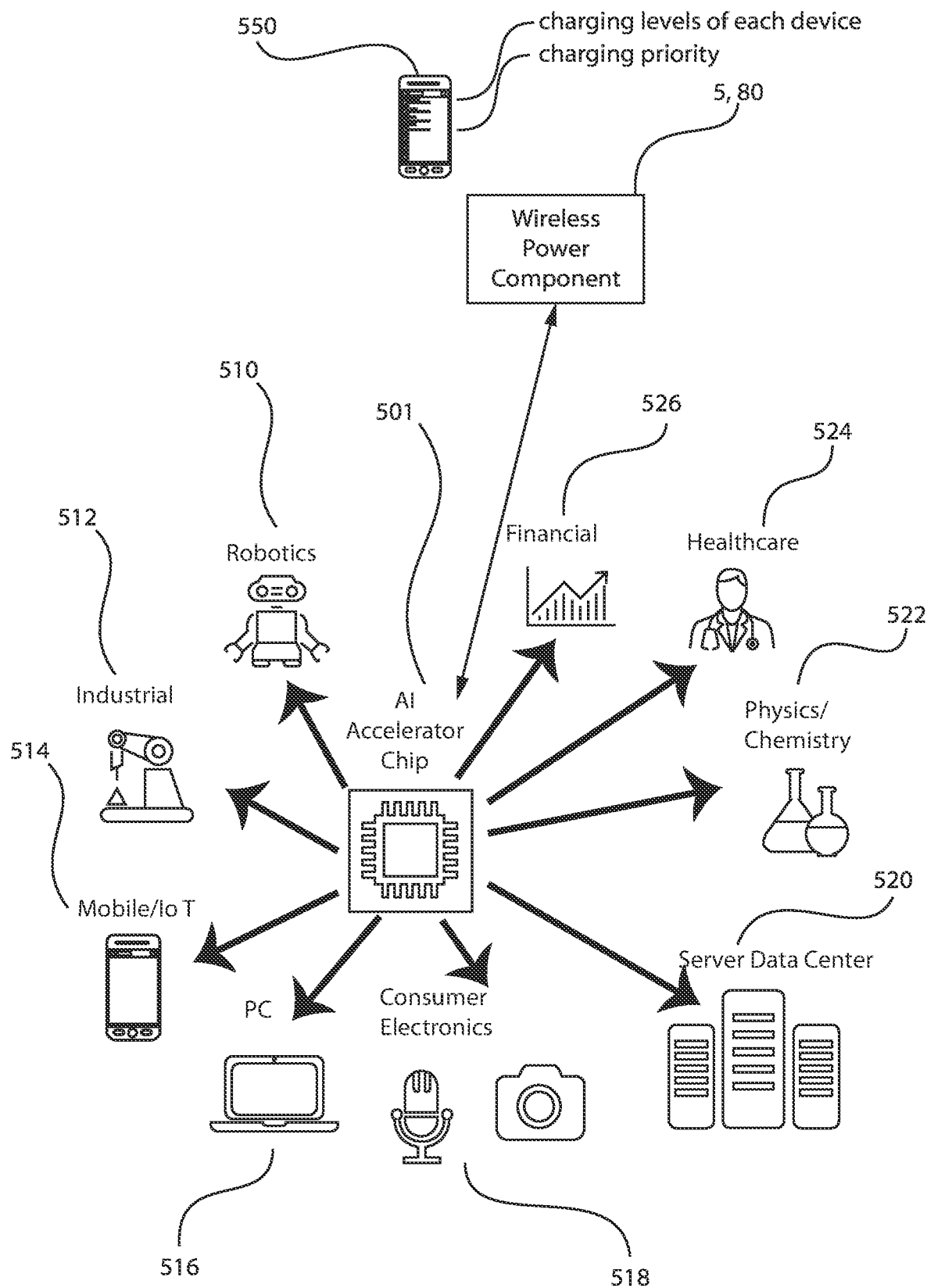
FIG. 9 illustrates practical applications for wirelessly powering a plurality of sensor arrays via an AI accelerator chip, in accordance with an embodiment of the present invention.

FIG. 9 illustrates practical applications for wirelessly powering a plurality of sensor arrays via an AI accelerator chip, in accordance with an embodiment of the present invention.

The artificial intelligence (AI) accelerator chip 501 can be used in a wide variety of practical applications, including, but not limited to, robotics 510, industrial applications 512, mobile or Internet-of-Things (IoT) 514, personal computing 516, consumer electronics 518, server data centers 520, physics and chemistry applications 522, healthcare applications 524, and financial applications 526. The AI accelerator chip 501 can be in communication with the wireless power component or system 5, 80. The wireless power component 5, 80 can be controlled by an electronic device or communication device 550, such as a smartphone or tablet, where, e.g., the charging levels of various devices can be controlled. Additionally, the charging priority status of each of the devices can also be controlled.

Moreover, the wireless power system 5, 80 can be controlled based on a number of variables or parameters. For instance, each device (or sensor) within a cluster of devices (or sensors) can be charged based on its distance or proximity from the wireless power system 5, 80. Additionally, each device (or sensor) within a cluster of devices (or sensors) can be charged based on its priority status. Some devices (or sensors) can have a higher priority status. Additionally, each device (or sensor) within a cluster of devices (or sensors) can be charged based on its charged percentage. In other words, if a cluster includes 10 devices (or sensors), then if 3-4 devices have already been charged at 60%, such devices can be put on hold, until the remaining devices have reached a 60% charge. Such custom configurations can be implemented by a user operating the electronic device 550 controlling the wireless power system 5, 80. The electronic device 550 can include, e.g., an app that allows a user to view the charging status of each device within each sensor cluster of the plurality of sensor clusters. The app can be configured to indicate what level to be charged for each device based on distance or priority or frequency, etc. One skilled in the art can contemplate a number of different configurations for automatically controlling the sensors (devices) of each sensor (device) cluster.

Figure 10:
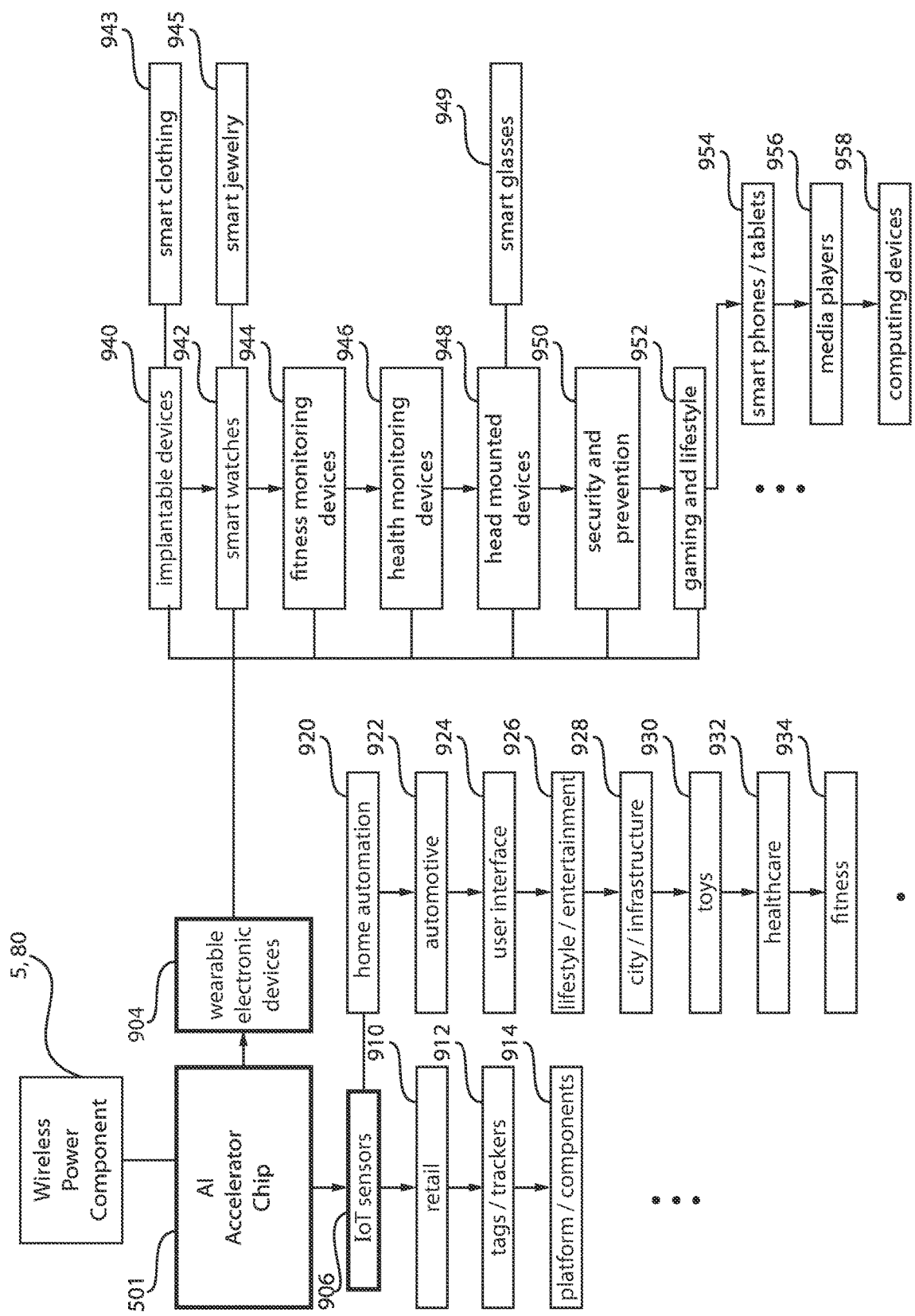
FIG. 10 is a block/flow diagram of a method for wirelessly powering a plurality of sensors with Internet of Things (IoT) systems/devices/infrastructure, in accordance with an embodiment of the present invention.

FIG. 10 is a block/flow diagram of a method for wirelessly powering a plurality of sensors with Internet of Things (IoT) systems/devices/infrastructure, in accordance with an embodiment of the present invention.

According to some embodiments of the invention, a network is implemented using an IoT methodology. For example, AI accelerator chip 222, 501 can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The AI accelerator chip 222, 501 described herein can be incorporated into any type of electronic devices for any type of use or application or operation.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the AI accelerator chip 222, 501 of the present invention can be incorporated into a variety of different devices and/or systems. For example, the AI accelerator chip 222, 501 can be incorporated into wearable or portable electronic devices 904. Wearable/portable electronic devices 904 can include implantable devices 940, such as smart clothing 943. Wearable/portable devices 904 can include smart watches 942, as well as smart jewelry 945. Wearable/portable devices 904 can further include fitness monitoring devices 944, health and wellness monitoring devices 946, head-mounted devices 948 (e.g., smart glasses 949), security and prevention systems 950, gaming and lifestyle devices 952, smart phones/tablets 954, media players 956, and/or computers/computing devices 958.

The AI accelerator chip 222, 501 of the present invention can be further incorporated into Internet of Thing (IoT) sensors 906 for various applications, such as home automation 920, automotive 922, user interface 924, lifestyle and/or entertainment 926, city and/or infrastructure 928, retail 910, tags and/or trackers 912, platform and components 914, toys 930, and/or healthcare 932, as well as fitness 934. The IoT sensors 906 can employ the AI accelerator chip 222, 501. Of course, one skilled in the art can contemplate incorporating such AI accelerator chip 222, 501 into any type of electronic devices for any types of applications, not limited to the ones described herein. The AI accelerator chip can be controlled or powered by the wireless power system 5, 80.

Figure 11:
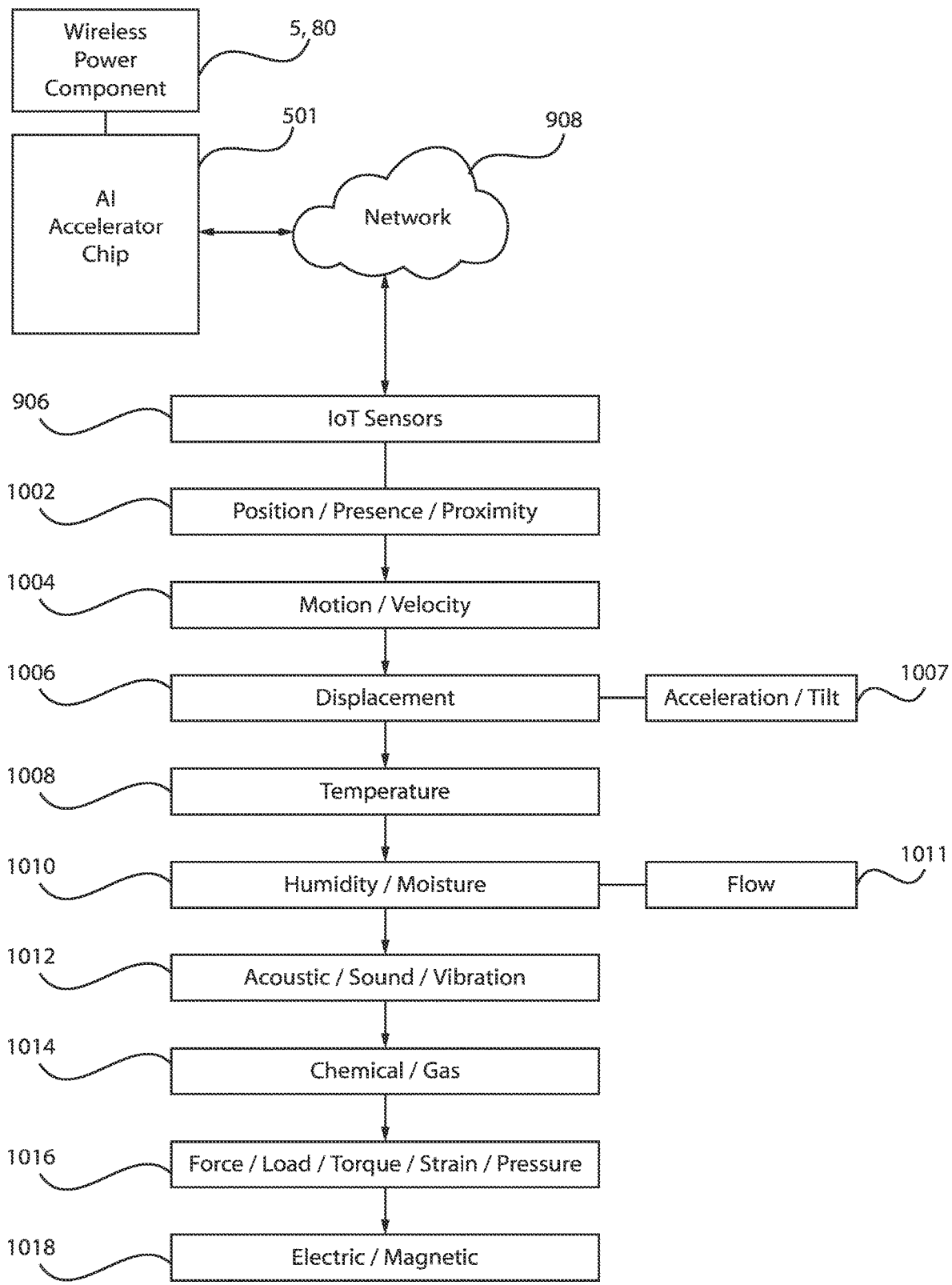
FIG. 11 is a block/flow diagram of exemplary IoT sensors used to collect data/information related to wirelessly powering a plurality of sensors, in accordance with an embodiment of the present invention.

FIG. 11 is a block/flow diagram of exemplary IoT sensors used to collect data/information related to wirelessly powering a plurality of sensors, in accordance with an embodiment of the present invention.

IoT loses its distinction without sensors. IoT sensors act as defining instruments which transform IoT from a standard passive network of devices into an active system capable of real-world integration.

The IoT sensors 906 can employ the AI accelerator chip 222, 501 to transmit information or data, continuously and in in real-time, via a network 908, to any type of distributed system. Exemplary IoT sensors 906 can include, but are not limited to, position/presence/proximity sensors 1002, motion/velocity sensors 1004, displacement sensors 1006, such as acceleration/tilt sensors 1007, temperature sensors 1008, humidity/moisture sensors 1010, as well as flow sensors 1011, acoustic/sound/vibration sensors 1012, chemical/gas sensors 1014, force/load/torque/strain/pressure sensors 1016, and/or electric/magnetic sensors 1018. One skilled in the art can contemplate using any combination of such sensors to collect data/information of the distributed system for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of wireless power systems for wirelessly powering sensor arrays (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A wireless power system comprising:
a phase locked loop (PLL) providing an input signal tuned in frequency;
a plurality of dividers coupled to the PLL to divide the frequency of the input signal, wherein the plurality of dividers provides a plurality of phases for the input signal;
a plurality of phase interpolators electrically connected to the plurality of dividers to generate multiple phases based on the input signal, each divider associated with a group of phase interpolators; and
a plurality of drivers electrically connected to the plurality of phase interpolators, the plurality of phase interpolators selecting phases from the plurality of phases for the input signal to digitally direct a plurality of output signals from the plurality of drivers each having a different frequency to a plurality of sensor clusters, each sensor cluster operating at a different frequency, wherein electromagnetic coupling is used for near field sensor clusters and radiating elements are used for far field sensor clusters.

2. The wireless power system of claim 1, wherein the plurality of drivers operate concurrently to wirelessly power the plurality of sensor clusters at the different frequencies.

3. The wireless power system of claim 1, wherein each driver of the plurality of drivers includes an inductive element for transmitting an output signal of the plurality of output signals.

4. The wireless power system of claim 1, wherein an amount of power wirelessly transmitted to each of the plurality of sensor clusters is controlled based on a distance between the wireless power system and each of the plurality of sensor clusters.

5. The wireless power system of claim 1, wherein an amount of power wirelessly transmitted to each of the plurality of sensor clusters is controlled based on a priority status assigned to each of the plurality of sensor clusters.

6. The wireless power system of claim 1, wherein the plurality of drivers handling the multiple phases are used for harmonic cancellation.

7. The wireless power system of claim 1, wherein the plurality of phase interpolators are used to control a phase, an amplitude, and a frequency of sensors associated with each of the plurality of sensor clusters.

8. A method comprising:
generating an input signal tuned in frequency by a phase locked loop (PLL);
dividing the frequency of the input signal by a plurality of dividers coupled to the PLL, wherein the plurality of dividers provides a plurality of phases for the input signal;
electrically connecting a plurality of phase interpolators to the plurality of dividers to generate multiple phases based on the input signal, each divider associated with a group of phase interpolators; and
electrically connecting a plurality of drivers to the plurality of phase interpolators, the plurality of phase interpolators selecting phases from the plurality of phases for the input signal to digitally direct a plurality of output signals each having a different frequency from the plurality of drivers to a plurality of sensor clusters, wherein electromagnetic coupling is used for near field sensor clusters and radiating elements are used for far field sensor clusters.

9. The method of claim 8, wherein the plurality of drivers operate concurrently to wirelessly power the plurality of sensor clusters at the different frequencies.

10. The method of claim 8, wherein each driver of the plurality of drivers includes an inductive element for transmitting an output signal of the plurality of output signals.

11. The method of claim 8, wherein an amount of power wirelessly transmitted to each of the plurality of sensor clusters is controlled based on a distance between the wireless power system and each of the plurality of sensor clusters.

12. The method of claim 8, wherein an amount of power wirelessly transmitted to each of the plurality of sensor clusters is controlled based on a priority status assigned to each of the plurality of sensor clusters.

13. The method of claim 8, wherein the plurality of drivers handling the multiple phases are used for harmonic cancellation.

14. The method of claim 8, wherein the plurality of phase interpolators are used to control a phase, an amplitude, and a frequency of sensors associated with each of the plurality of sensor clusters.

15. A wireless power system comprising:
a plurality of dividers each associated with a phased locked loop system to divide a frequency of an input signal, wherein the plurality of dividers provides a plurality of phases for the input signal;
a plurality of phase interpolators electrically connected to each of the plurality of dividers such that each divider of the plurality of dividers generates a different frequency, each divider associated with a group of phase interpolators; and
a plurality of drivers electrically connected to the plurality of phase interpolators the plurality of phase interpolators selecting phases from the plurality of phases for the input signal to digitally steer each of the different frequencies from the plurality of drivers to respective sensor clusters, wherein electromagnetic coupling is used for near field sensor clusters and radiating elements are used for far field sensor clusters.

16. The wireless power system of claim 15, wherein the plurality of drivers operate concurrently to wirelessly power the sensor clusters at the different frequencies.

17. The wireless power system of claim 15, wherein each driver of the plurality of drivers includes an inductive element for transmitting each of the different frequencies.

18. The wireless power system of claim 15, wherein an amount of power wirelessly transmitted to each of the sensor clusters is controlled based on a distance between the wireless power system and each of the sensor clusters.

19. The wireless power system of claim 15, wherein an amount of power wirelessly transmitted to each of the sensor clusters is controlled based on a priority status assigned to each of the sensor clusters.

20. The wireless power system of claim 15, wherein an amount of power wirelessly transmitted to each of the sensor clusters is controlled based on a charging percentage of each sensor within the sensor clusters.

* * * * *